May 18, 1965   P. CIBIÉ   3,184,591
PROJECTORS, MORE PARTICULARLY MOTOR VEHICLE HEADLIGHTS
Filed July 19, 1957   3 Sheets-Sheet 1
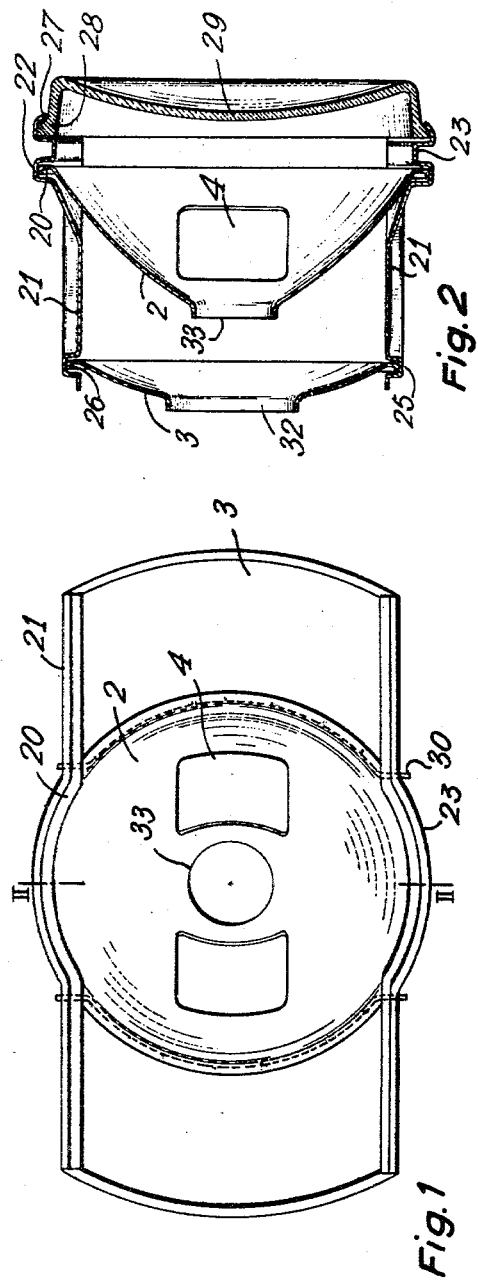
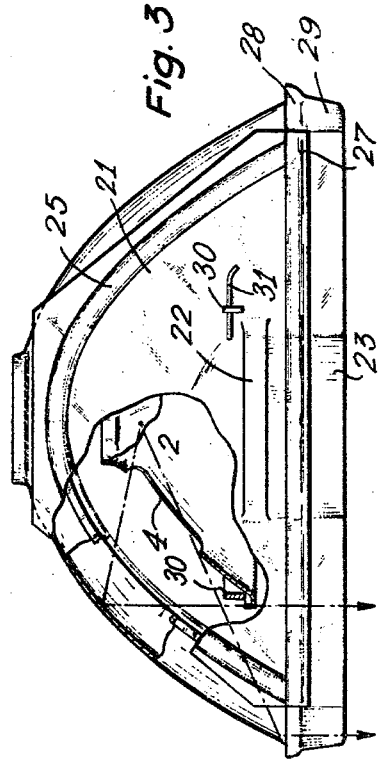
Inventor:
Pierre Cibié

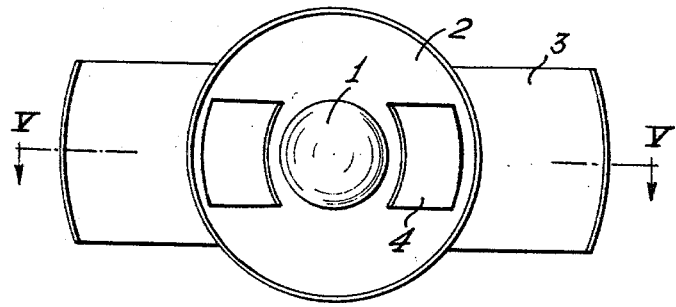
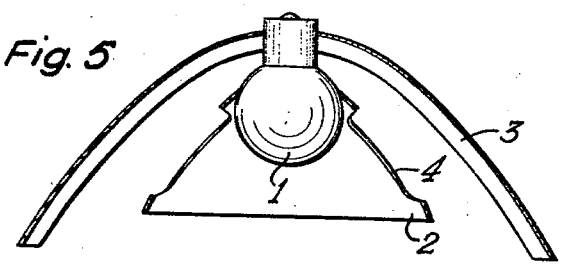
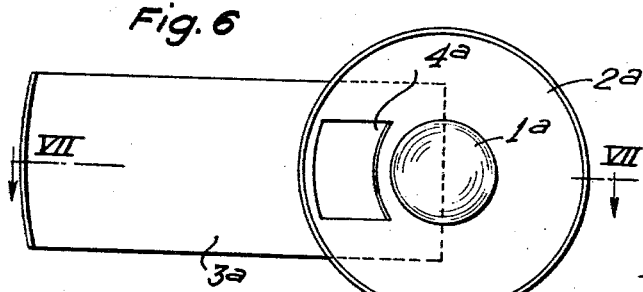
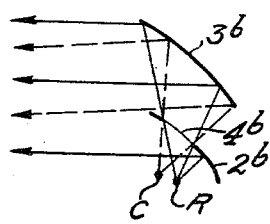
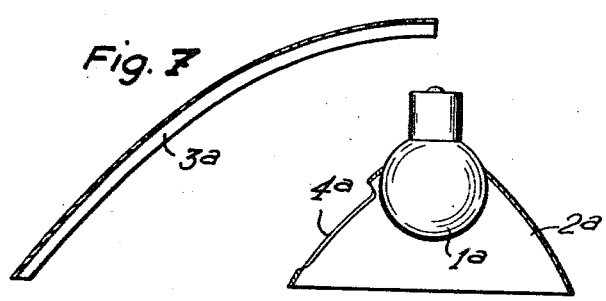

May 18, 1965     P. CIBIÉ     3,184,591
PROJECTORS, MORE PARTICULARLY MOTOR VEHICLE HEADLIGHTS
Filed July 19, 1957     3 Sheets-Sheet 3
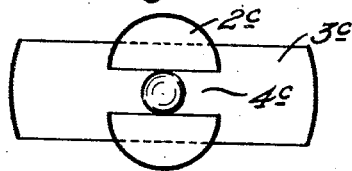
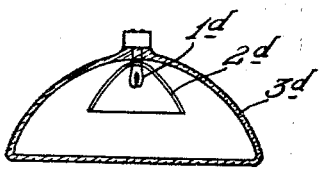
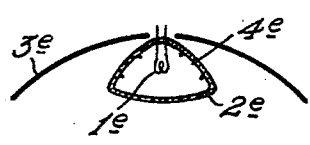
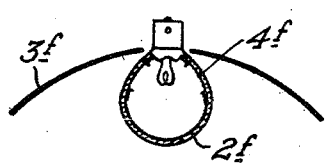
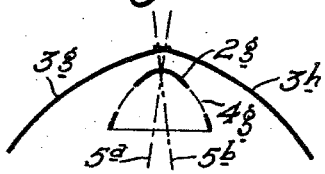
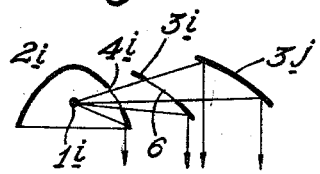
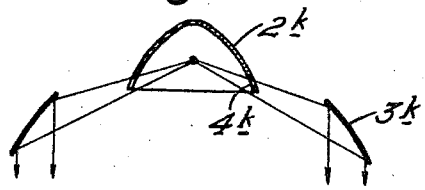
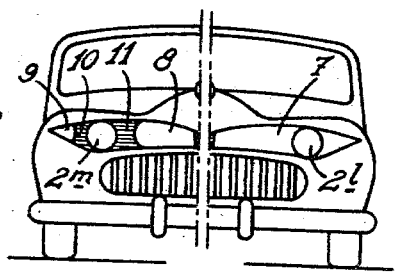
Inventor:
Pierre Cibié

United States Patent Office 3,184,591
Patented May 18, 1965

3,184,591
PROJECTORS, MORE PARTICULARLY MOTOR
VEHICLE HEADLIGHTS
Pierre Cibié, 150 Ave. de Wagram, Paris, France
Filed July 19, 1957, Ser. No. 673,073
Claims priority, application France, Nov. 21, 1956,
726,051, Patent 1,160,871
2 Claims. (Cl. 240—41.35)

This invention relates to long range light projectors.

Small diameter projectors are provided with a reflector adapted for efficiently using the light flux emitted by the source of light. However, the range of such a projector is limited, since, according to Blondel's law, the range of a projector is proportional to the brightness of the light source and to the apparent area of the projector.

Therefore, in order to obtain a satisfactory range, the circular reflecting mirror to be used should have so large a diameter that its arrangement in a car will be difficult, especially due to the space required in the vertical direction for its accommodation.

For collecting the greatest possible portion of light flux with a parabolic reflector, the parabola parameter to be chosen should be equal or substantially equal to the square root of the product of the reflector aperture radius by the radius of the reflector bottom or of the electric bulb used as a light source.

An object of the present invention is to provide a projector which, while having a large range and good illumination properties at close distance, is of relatively small dimensions and thus more particularly adapted for use on vehicles.

According to the invention, a projector comprises a reflector which has a small apparent area and which when consisting of a parabolic mirror, has a small parabola parameter calculated as specified above, in order to collect the greatest possible portion of the light flux emitted from the source of light, the surface of said reflector being provided with windows behind which are disposed corresponding portions of a second reflector having a larger apparent area.

The surface of the two reflectors are preferably paraboloids of revolution, either coaxial or not, and having or not the same focus, according to the desired distribution of the light.

The aperture of the reflector having the larger apparent area may have any shape depending solely on the shape given to the window or windows of the reflector of smaller apparent area or conversely on the shape of the opening or contour line surrounding the glass which closes said larger projector.

It is very easy to house the reflector of smaller apparent area, which may simply consist of a reflecting layer on a lamp bulb with blank areas to form the windows, and conveniently the reflector unit may be generally rectangular.

Some preferred embodiments of the invention will now be described more fully with reference to the accompanying drawings, in order to make it better understood how the invention may be carried out in the practice. In the drawings:

FIG. 1 shows a front view of a projector according to the invention, in which the front closing glass is omitted.

FIG. 2 shows a diametral section made along line II—II of FIG. 1.

FIG. 3 shows a plan view corresponding to FIG. 1, with parts broken away.

FIG. 4 is a diagrammatical front view of a projector according to an embodiment of the invention.

FIG. 5 is a section on the line V—V of FIG. 4.

FIG. 6 is a front view of another embodiment of the invention.

FIG. 7 is a section on the line VII—VII of FIG. 6.

FIG. 8 is a diagrammatical view showing the paths of the light rays, in a crossing beam and in a normal beam aimed straight ahead for a vehicle headlight according to the invention.

FIG. 9 is a front view on a smaller scale showing another alternative embodiment of the invention.

FIG. 10 is a section of a sealed projector unit according to the invention.

FIG. 11 is a sectional view of a further embodiment of the invention.

FIG. 12 is a similar sectional view of still another embodiment.

FIG. 13 is a diagrammatical section of a projector unit according to an embodiment of the invention wherein the two reflector elements are not coaxial.

FIG. 14 shows diagrammatically another projector unit with three reflecting steps.

FIG. 15 is a sectional view showing another embodiment wherein windows are provided on the edge of the inner reflector, and FIGS. 16 and 17 are diagrammatical half front views of vehicles adapted for being equipped with projectors according to the invention.

The construction shown in FIGS. 1 to 3 comprises a reflector 2 fastened by diametrally opposite sectors 20 inserted in ribbed plates 21, said sectors 20 being engaged in ribs 22 of said plates. Reflector 2 is to this effect reinforced in the vicinity of its front edge by a punched rim.

Each plate 21 is formed moreover with a protruding cylindrical part 23, this cylindrical part being bounded by a nearly conical sector 24 to the plane parts of said plate.

Further, the plane part of each plate is so formed as to present a parabolic rear rib 25 adapted for accommodating the punched reinforced edge 26 of reflector 3.

The front edges of plates present a groove 27 adapted for accommodating the marginal string-courses of a closing glass 29 for the projector.

The mounted elements are maintained by bars the form of which is nearly a circle sector, the extremities 30 of which pass through openings in plates 21 and said protruding extremities receiving holding pins 31 in corresponding perforations.

The rear reflector 3 is provided with a rear opening 32 which allows the introduction of a lamp holder which is fastened, in a known manner, at the edge 33 of the rear opening of the reflector 2.

Referring next to FIGS. 4 and 5, the projector illustrated therein comprises a lamp 1 the filament of which is situated at the focus of a paraboloid reflector 2 having a circular aperture of relatively small diameter, the parameter of the paraboloid being also small so as to catch the greatest possible portion of the light flux emitted by the lamp 1.

Behind the reflector 2 is placed a reflector 3 formed by a portion of rectangular apparent contour of a paraboloid of wider aperture than the paraboloid 2 but having the same focus as the latter. The light rays which reach the reflecting surface of the paraboloid 3 are those which have passed through windows 4 cut out in the reflector 2. The windows 4 are of rectangular shape with substantial extent in both directions as shown in FIGS. 1, 4 and 6. The bounding edge of the windows 4 substantially follows the central projection of the contour of the reflector 3 on the surface of the reflector 2, with the luminous center of the relevant lamp filament as the center of the projection. The contour of the windows may be at some distance inside the above mentioned central projection.

A projector unit is thus provided which comprises a paraboloid reflector of small diameter and small parameter and which efficiently utilizes the light flux of the lamp; moreover, as the second reflector 3 has a large apparent surface, the range of the projector is increased although it may have, for example, a small extent in the vertical direction.

The shape of the apparent contour of such a projector, defined for example by the frame of the closing glass, may be varied widely. It may be, for example, elongated in the horizontal or in the vertical direction, or even in several directions. The only conditions for the shape to be chosen is to afford somewhere a sufficient accommodation for the small aperture reflector. Behind the remaining portions of the reflector front will be arranged segments of high aperture reflector and the windows in the small reflector will be designed as above described in accordance with the central projection of the contour of the large apparent area projector.

Referring now to FIGS. 6 and 7, according to the space available for accommodation, the large aperture reflector $3a$ may be restricted to an unsymmetrical segment of a paraboloid coaxial with a lamp $1a$ and the smaller reflector $2a$ provided with a single window $4a$. With such an arrangement, one side of the projector may be made part-circular if desired.

FIG. 8 shows that a projector as described above according to the invention is adapted to meet the requirements of road vehicles for normal lighting and crossing lighting. The normal lighting filament R is near the common focus of the reflector $2b$ provided with the window $4b$ and of the outer reflector $3b$. The crossing lighting filament C may be offset from the axis of revolution of the reflectors $2b$ and $3b$. The rays issued either from the filament C and the filament R and passing through the window $4b$ should strike the projector $3b$, and consequently the latter must have such an extent as to cover the central projections of the window $4b$ from both the center R and the center C.

As shown in FIG. 9, the enveloping reflector $2c$ may consist of two separated paraboloid segments, the window $4c$ cutting across the paraboloid surface. The space occupied by the reflector $2c$ may thus be reduced.

A projector of this type may be designed as a "sealed beam" headlight. Such a sealed beam headlight, containing one or more bare lighting filaments without a protecting bulb, may include, as shown in FIG. 10, a chamber the back wall of which forms the reflector $3d$ of large apparent area, in front of which is placed the enveloping reflector $2d$ formed with windows or gaps.

In the same way there may be provided a small sealed reflector $2e$ (FIG. 11) enveloping one or more bare filaments $1e$ and formed with windows $4e$ which are obtained by not applying to the reflector $2e$ in the area of the windows the reflecting layer which is applied to the remaining rear portion of the sealed globe. The latter has associated therewith outer reflecting segments $3e$ which form the reflector of larger apparent area. FIG. 12 shows a similar projector wherein the sealed globe $2f$ is a lamp bulb the rear portion of which is suitably shaped as a paraboloid whereon nonreflecting areas $4f$ are left to form the windows through which the outer reflector segments $3f$ are illuminated.

It should be understood that the optical axes of the various reflector parts may coincide or not. In FIG. 13 is illustrated an example, wherein the axes $5a$ and $5b$ of two outer reflectors $3g$ and $3h$ of large apparent areas intersect across the axis of the inner enveloping reflector $2g$. The reflectors $3g$ and $3h$ are illuminated through the windows $4g$ and project two beams which are first converging with each other—and then diverging.

Thus, a crossing lighting may be obtained by means of the inner enveloping reflector $2g$, the axis of which is for this purpose suitably inclined on the horizontal, and a normal long range lighting by means of the reflectors $3g$ and $3h$, the axes of which are in the horizontal plane, and may be arranged to be parallel, coincident, diverging or converging according to the desired results. With such an arrangement, a single filament lamp may be used, and, for switching from one lighting condition to another, shutters are provided for the windows of the inner enveloping reflector. In crossing lighting, said shutters are closed and only the light flux from the inner reflector is used to give a dropping beam for illumination at short distance. For a normal long range ahead lighting, the shutters are opened to combine the beams of the inner and outer reflectors.

For certain applications, it may be convenient to provide a number of successive reflectors as shown in FIG. 14. In the embodiments illustrated therein, the inner enveloping reflector $2i$ is provided with windows $4i$ through which the light from the source $1i$ passes to a second reflector $3i$ having itself windows 6 through which a still wider reflector $3j$ is illuminated. Such an arrangement, which may comprise more than three successive reflectors, is convenient in certain constructions.

In another embodiment of the invention shown in FIG. 15, the windows $4k$ may extend to the edge of the inner enveloping reflector $2k$ to illuminate the wider reflector $3k$. If the inner reflector $2k$ is less enveloping, i.e. does not extend so far in front of the light source, the windows $4k$ may be dispensed with, as the reflector $3k$ is forward enough to receive the light.

Such a construction permits giving the cowling of the reflector, more particularly in an automotive vehicle, any desired shape. As shown in FIGS. 16 and 17, light openings 7 or 8 and 9 may be provided at the desired places in the front part of the vehicle body, the smaller dimension of said openings being just sufficient to accommodate the generally circular contour of the inner reflector $2l$ or $2m$ of the projector. The contour of the windows in the inner reflector is derived from the contour of the openings 7, or 8 and 9. The opening 7 may be entirely closed by a glass, which may be in one piece or composite. Opaque intermediate areas, such as 10 and 11, may also be provided.

Of course, without departing from the scope of the invention, modifications may be made in the features of the embodiments described above. In particular, the surfaces of the reflectors, although usually parabolic, may be chosen from other families of surfaces, and the two reflector surfaces may be of different families. Moreover, of course, projectors of this type may be associated with striated glasses or the like, optical correctors as well as modifiers, or other known projector components.

What I claim is:

1. A light projector comprising a reflector having the shape of a paraboloid of revolution with a circular aperture, said reflector having a focus, a light source at said focus, said reflector enveloping said light source and collecting to a maximum light flux emitted by said source to reflect the light flux forwardly through the aperture to provide illumination, said reflector including a portion constituting a window which permits the passage therethrough of light, said window having an outline of generally rectangular form with substantial extent in both dimensions, an outer reflector supporting the first said reflector therewithin as a self-contained unit, said outer reflector presenting a relatively large apparent area of generally rectangular shape narrower in extent than the aperture of the reflector but laterally projecting therebeyond for reflecting light flux passing through the window in the inner reflector to increase the range of the projector while the overall size of the projector is restricted in one dimension to the diameter of the inner reflector, said outer reflector having the shape of a paraboloid of revolution with a focus coincident with the light source, said outer reflector having an outer contour corresponding in shape with that of the window in the inner reflector and being located behind the latter a distance related to the size of the window and the distance of the light source from the surface of the inner reflector to directly collect and reflect all of the directly emitted light flux from the light source which passes through the window in a direction parallel to the light flux reflected from the inner reflector, the outer reflector extending forwardly of the opening of the inner reflector to receive directly emitted light flux from the light source for reflecting the received light flux forwardly and parallel to the light flux reflected from the inner reflector.

2. A light projector comprising a reflector having the shape of a paraboloid of revolution with a circular aperture, said reflector having a focus, a light source at said focus, said reflector enveloping said light source and collecting to a maximum light flux emitted by said source to reflect the light flux forwardly through the aperture to provide illumination, said reflector including a portion constituting a window which permits the passage therethrough of light, said window having an outline of generally rectangular form with substantial extent in both dimensions, an outer reflector supporting the first said reflector therewithin as a self-contained unit, said outer reflector presenting a relatively large apparent area of generally rectangular shape narrower in extent than the aperture of the reflector but laterally projecting therebeyond for reflecting light flux passing through the window in the inner reflector to increase the range of the projector while the overall size of the projector is restricted in one dimension to the diameter of the inner reflector, said outer reflector having the shape of a paraboloid for revolution with a focus coincident with the light source, said outer reflector having an outer contour corresponding in shape with that of the window in the inner reflector and being located behind the latter a distance related to the size of the window and the distance of the light source from the surface of the inner reflector to directly collect and reflect all of the directly emitted light flux from the light source which passes through the window in a direction parallel to the light flux reflected from the inner reflector, the projector further comprising a second portion constituting a window in the inner reflector, said windows being located at diametrically opposed positions in the inner reflector and constituting the sole portions through which light may pass through the surface of the inner reflector, the projector further comprising a second outer reflector associated with said second window, the two outer reflectors having geometrical axes which are offset from one another and at least one of which is offset from the geometrical axis of the inner reflector.

References Cited by the Examiner
UNITED STATES PATENTS

| | | | |
|---|---|---|---|
| 1,200,587 | 10/16 | Cloninger | 240—44.2 |
| 1,245,512 | 11/17 | Roffy | 240—41.35 |
| 1,500,941 | 7/24 | Ireland | 240—46.55 |
| 1,520,192 | 12/24 | Madigan | 240—46.55 |
| 1,735,090 | 11/29 | Pollard | 240—41.35 X |
| 1,755,737 | 4/30 | Kesselring | 240—46.55 X |
| 7,773,071 | 8/30 | Woolums | 240—46.55 |
| 2,209,887 | 7/40 | Kurth | 240—47 |
| 2,218,678 | 10/40 | Hoffman | 240—44.2 X |
| 2,810,321 | 10/57 | Ulffers | 240—41.3 X |

NORTON ANSHER, *Primary Examiner.*

D. B. LOWE, E. E. FULLER, G. A. NINAS, Jr.,
*Examiners.*